United States Patent [19]

Lang et al.

[11] Patent Number: 4,578,709
[45] Date of Patent: Mar. 25, 1986

[54] FLAT OPTICAL TV SCREEN

[75] Inventors: Paul W. Lang; Franklin C. Gribshaw, both of Long Beach, Calif.

[73] Assignees: Allen Jensen; Goldstake, ; a part interest to each

[21] Appl. No.: 637,273

[22] Filed: Aug. 3, 1984

[51] Int. Cl.⁴ .............................................. H04N 3/08
[52] U.S. Cl. ................................... 358/230; 358/901; 358/200; 340/766
[58] Field of Search .................. 358/56, 59, 230, 240, 358/901, 200; 340/766, 752, 815.31, 795; 178/30

[56] References Cited

U.S. PATENT DOCUMENTS 3,473,872 10/1969 Okamura ............................ 358/901
4,280,125 7/1981 Kazan ................................. 358/230

Primary Examiner—Tommy P. Chin
Attorney, Agent, or Firm—Pastoriza, Kelly & Lowry

[57] ABSTRACT

A flat TV screen is provided by overlapping rows and columns of fiber optics. Each cross-over point will emit more light than radiates from the side of a single optical fiber when both of the crossing fibers are energized. Therefore, a dot matrix can be generated by controlling the entrance of light into the ends of the optical fibers in the rows and columns. The rows of optical fibers are sequentially energized by a light signal of constant brightness. The columns in turn are successively energized during the time period that each row is energized with signals derived from a TV video signal to thereby provide an optical reproduction of the TV signal from the dot matrix of light defined at the cross over points of the rows and columns. A filter covering having the property of emitting light at a given point on its surface only when such point is stimulated by light exceeding a given threshhold in brightness may be positioned over the dot matrix of light so that when the filter covering is used, the dot matrix of light is reproduced with higher contrast than in the absence of the covering.

10 Claims, 3 Drawing Figures

4,578,709

FLAT OPTICAL TV SCREEN

FIELD OF THE INVENTION

This invention relates generally to television and more particularly to a method and apparatus for converting a TV video signal into light images wherein the light images are displayed on a relatively flat screen.

BACKGROUND OF THE INVENTION

Conventional TV screens reproduce a video signal by means of a sweeping electron beam. Essentially, the electron beam will sweep back and forth horizontally along a series of rows. The intensity of the electron beam itself is modulated by the video portion of the TV signal, applied to the electron gun grid so that for each sweep of the beam along a row, the emitted light from the screen resulting from the electron impingement upon phosphor making up the screen is modulated in accord with this video signal. The resulting picture is generated for viewing.

It is found that the light emitted by the phosphors of the screen can be damaging to human eyes over prolonged periods. Further, the electron beam must travel over a given length to accommodate deflection and focusing coils and the like. As a result, the television screen is relatively bulky; that is, it requires space to accommodate the depth of the structure.

BRIEF DESCRIPTION OF THE PRESENT INVENTION

With the foregoing in mind, the present invention contemplates a method and apparatus for converting the TV video signal into light images which avoids problems encountered with the conventional cathode ray tube.

More particularly, rather than utilize any type of electron beam and responsive phosphor material, the TV video signal is converted in accord with the method of the present invention by providing overlapping rows and columns of mediums, each emitting light laterally from its path when energized, such that a cross-over point will emit more light than radiates from the side of a single medium when both of the crossing mediums are energized. Each row is sequentially energized and at the same time, all of the columns are successively energized during the time period that each row is energized. Signals derived from the TV video signal are utilized to modulate light for energizing the columns to thereby provide an optical reproduction from a dot matrix of light of the TV signal defined at the cross-over points of the rows and columns.

In a preferred embodiment of the invention, the various mediums constitute optical fibers treated to emit light laterally when energized with light at one end.

The preferred method also includes the step of overlying the overlapping rows and columns with a filter covering having the property of emitting light at a given point on its surface only when such point is stimulated by light exceeding a given threshhold in brightness whereby the dot matrix of light when utilizing the filter covering is reproduced with higher contrast than in the absence of the covering.

BRIEF DESCRIPTION OF THE DRAWINGS

A better understanding of this invention will be had by now referring to the accompanying drawings in which.

DETAILED DESCRIPTION OF THE INVENTION

Figure 1:
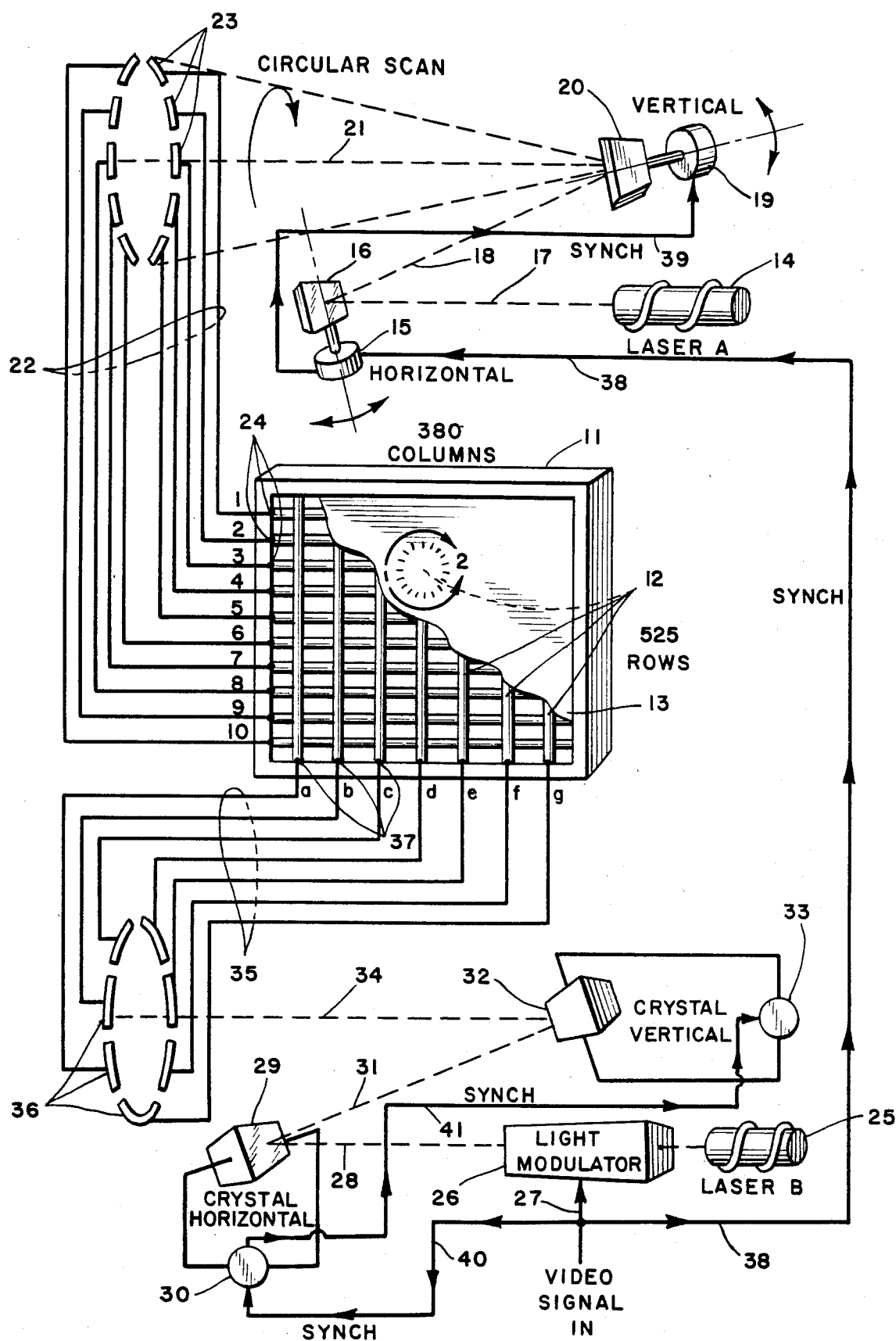
FIG. 1 is a highly schematic diagram of the flat TV screen of this invention with associated components for converting a TV video signal into light images.

Referring to the central portion of FIG. 1, there are shown overlapping rows and columns of mediums, preferably optical fibers. The fibers are shown in the form of elongated cylinders and are greatly exaggerated in diameter for purposes of clarity. In the schematic showing there are ten rows of the fibers indicated by the numerals 1–10 and seven columns of the fibers indicated by the letters a–g. In reality, there would be provided 525 rows of the optical fibers and 380 columns of the optical fibers.

The ends of the rows and fibers are supported in a frame 11 defining essentially a flat TV screen.

As will become clearer later on, each of the fibers in the rows and columns of optical fibers will emit light laterally from its path when energized such that a crossover point will emit more light than radiates from the side of a single optical fiber when both of the crossing fibers are energized. For example, the row fiber 3 and the column fiber d are indicated in FIG. 1 as being energized so that at their cross-over point enclosed within the circular arrow 2 there is emitted a bright spot or dot of light. The various cross-over points, some of which are indicated by the numeral 12 in FIG. 1, thus make up a dot matrix which can be used for generating light images.

In the preferred embodiment of the invention, there is provided a filter covering 13 overlying the rows and columns. This cover includes means responsive only to light of brightness exceeding a given threshhold incident upon a point of the covering to emit light from said point, said emitted light being proportional in brightness to the brightness of the incident light in excess of such threshhold. As a result, the dot matrix of light when utilizing the filter covering 13 is reproduced with higher contrast than in the absence of the covering.

In order to produce the desired light image from the screen structure 11 described in FIG. 1, there are provided means for sequentially passing light of a constant brightness into each of the rows so as to simulate the sweeping of an electrode beam in a raster pattern.

Referring to the top portion of FIG. 1, one example of such a means for sequentially passing light into the rows is shown. This means includes a first laser 14, a first galvanometer 15 for oscillating a mirror 16 positioned to intercept a beam of light 17 from the first laser 14. The galvanometer 15 causes the mirror to oscillate in such a manner as to sweep the reflected beam 18 from the mirror 16 back and forth sinusoidally in a horizontal direction. A second galvanometer 19 in turn is arranged to oscillate a mirror 20 positioned to intercept the reflected beam 18 in a manner to sweep the re-reflected reflecting beam shown at 21 up and down sinusoidally in a vertical direction. The re-reflected beam 21 can thus be made to swing in a circle by adjusting the amplitude and phase of the oscillations of the first and second galvanometers 15 and 19.

Referring to the upper left portion of FIG. 1, there is shown a first plurality of light transmitting means 22 having first ends 23 in a circular array in positions to be successively swept by the re-reflected beam 21. Second ends of these light transmitting means connect respectively to the rows 1-10 as indicated, for example, at 24.

The first ends 23 are arcuate in shape following the circular array so that there will be a sustained period of time that each end is energized by the re-reflected beam 21 of laser light. Thus, the first row 1 will be energized for a finite period and then immediately thereafter the second row 2 will be energized and so forth. A "scanning" of the rows is thus effected by light from the first laser.

Appropriate means responsive to the TV signal to modulate the light brightness in accord with the video portion of the TV signal and successively pass the modulated light into all of the columns during the time period that each row is energized is illustrated in the lower portion of FIG. 1. This latter means thus includes a second laser 25 shown in the lower right-hand portion passing light into a light modulator 26. Light modulator 26 receives the video signal from the TV signal as at 27 so that light is modulated in brightness in accord with the video portion of the TV signal. This modulated light signal 28 passes to a first light beam deflecting means in the form of a polished surface 29 of a crystal. This crystal is electrically driven by driver 30 such that the polished surface 29 is distorted to sweep the re-flected laser beam shown at 31 back and forth sinusoidally in a horizontal direction. A second light beam deflecting means constitutes a second crystal having a smoothly polished reflecting surface 32 arranged to be driven by a driver 33 such that application of energy from the driver 33 distorts the polished surface 32 in a manner to cause the reflecting beam 31 intercepted by the surface 32 to move up and down sinusoidally in a vertical direction. This re-reflected beam is shown at 34 and as in the case of the galvanometers, by adjusting the phase and amplitude of the signals from the drivers 30 and 33, the re-reflected beam 34 can be made to follow a circular path.

In the example chosen for illustrative purposes, crystals have been used rather than galvanometers since the response time of a crystal is considerably faster than that of a galvanometer and a much higher frequency is required for the sweeping of the columns by a light beam than is required for the sweeping of the rows.

A second plurality of light transmitting means 35 has first ends arranged in a circular array in the form of arcuate shapes as indicated at 36 positioned to intercept the re-reflected beam 34. Second ends of this second light transmitting means connect respectively to the columns a through g as indicated by way of example at 37.

In order that it is assured the columns will be completely successively swept through by the light beam from the second laser during the period that each row is energized by the first laser, appropriate synchronizing signals are provided from the original TV signal. Such synchronizing signals are passed along the line 38 shown in the lower right hand side of FIG. 1 to the horizontal galvanometer 15 from which a further synchronizing signal is derived on line 39 passing through the second galvanometer 19. This latter synchronizing signal assures that the galvanometers 15 and 19 are operated 90° out of phase so as to provide the desired circular scan.

Referring again to the lower right portion of FIG. 1, a synchronizing signal is also passed from the video input signal along a line 40 to the driver 30 for the first light beam deflecting means in the form of the crystal surface 29 and from the driver 30 a further synchronizing signal is passed on line 41 to the crystal drive 33. Again, this latter synchronizing signal on line 41 assures that the drivers 30 and 33 are 90° out of phase so that a proper circle sweep will be effected by the re-reflected beam 34.

Figure 2:
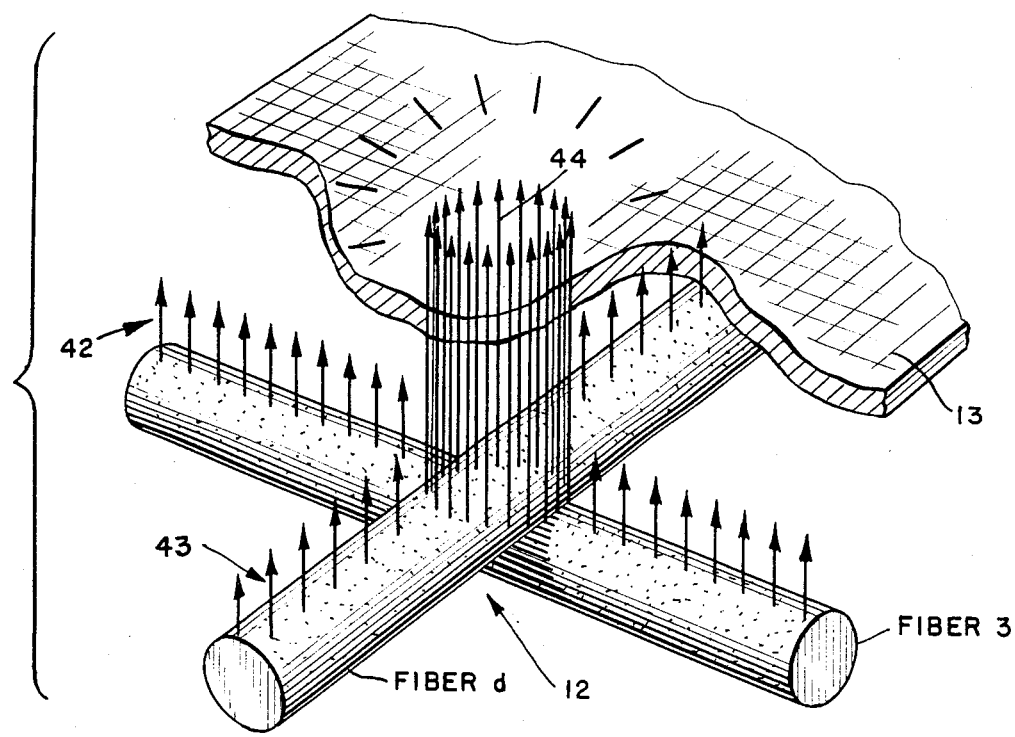
FIG. 2 is a greatly enlarged fragmentary perspective view of a portion of the screen enclosed within the circular arrow 2 of FIG. 1; and, FIG. 3 is a timing diagram useful in explaining the operation of the invention.

Referring now to the enlarged fragmentary view of FIG. 2, there is shown by way of example a cross-over point 12 for fiber No. 3 of the rows of fibers and fiber d of the columns of fibers. It is to be noted that each of the fibers has its exterior surface treated so that light will be emitted laterally or from the side as indicated respectively by the arrows 42 and 43. At the cross-over point, the light emitted laterally from the two fibers is considerably brighter as indicated at 44. This incident light is shown impinging on the filter covering 13 at that point of the covering overlying the cross-over point 12. Filter covering 13 may have appropriate material which will re-emit light from the point only when a given threshhold of light is exceeded. Thus, assuming that the light from any single fiber optic emitted laterally such as indicated by the arrows 42 and 43 is less than the threshhold while the light emitted from the cross-over point 12 is greater than this threshhold, then light will be visible from the top side of the filter covering 13 only when both fibers defining a cross-over are energized. The brightness of the light at the cross-over point above the threshhold level will be determined by the brightness of the light passed to the column fiber which in turn is determined by the modulated light beam from the second laser described in FIG. 1.

Figure 3:
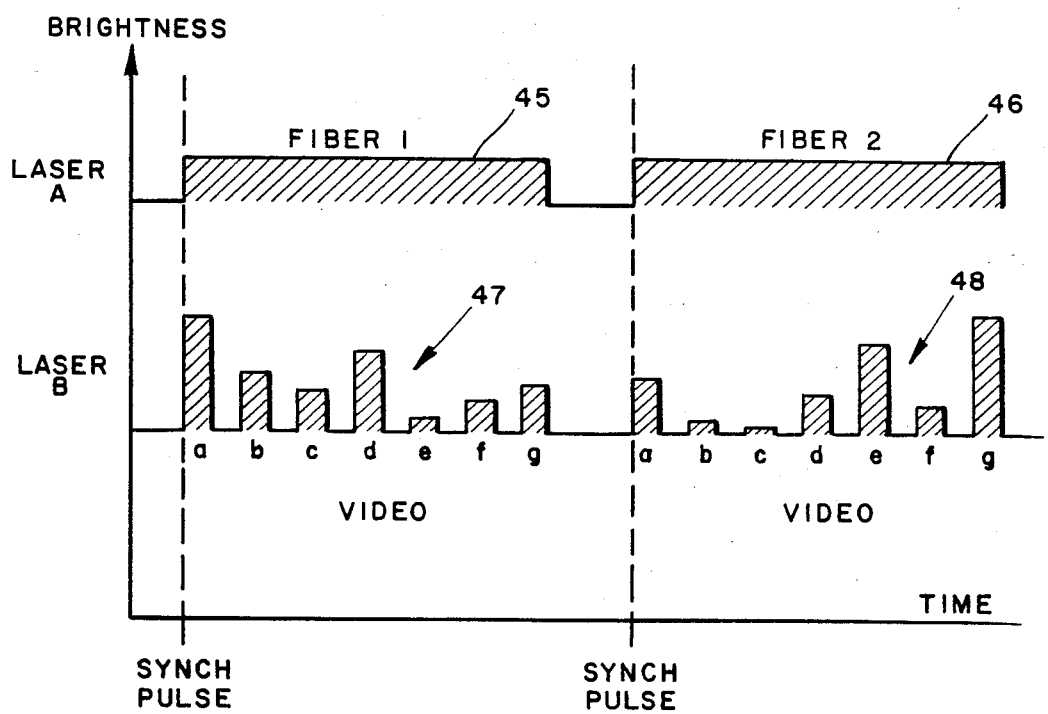

All of the foregoing will be better understood by now referring to FIG. 3 wherein there is diagramatically plotted the light intensities in the respective rows and columns of the fibers over a given period of time.

Referring to the top portion of FIG. 3, there is indicated a laser A which corresponds to the first laser 14 described in FIG. 1. The constant brightness provided by this laser for the successive fibers is indicated at 45 and 46 for fiber 1 and fiber 2. It will be understood that the successive rows of fibers are successively energized with this constant brightness.

In the second diagram of FIG. 3, there is designated laser B which corresponds to the second laser 25 of FIG. 1. The light in this laser is modulated in intensity as indicated at 47 so that at various times that the fiber 1 is energized, light at the successive cross-over points as the corresponding columns are energized will be controlled by the modulated brightness 47.

Similarly, for the next fiber No. 2, when the columns are scanned, there will be different video modulated signals such as indicated at 48 so that there will be different intensities at the various cross-over points.

If the threshhold light defined by the filter covering 13 is made equal to the brightness indicated by the numerals 45 and 46 provided by the laser A, then only the modulated signals will be visible on the other side of the filter covering 13 so that the desired optical image can be built up corresponding to the video signal.

It should be understood that while the optical fibers making up the rows and columns are treated so that light will be emitted laterally, all as described in detail in FIG. 2, the light transmitting means schematically indicated at 22 and 35 for transmitting light to the rows and columns respectively may comprise optical fibers which will only pass light entering one end out the opposite end so that there is no light loss from the sides. This will assure optimum efficiency in transmitting the light to the rows and columns.

Further it should be understood that a color picture can be easily reproduced by simply introducing the color into the light signal from the second laser 25 described in FIG. 1 for energizing the columns of optical fibers. Thus, it is not necessary to have three dot groupings making up a screen matrix as in conventional color TV screens. Rather, a particular color will be provided at the cross-over point by the original light passed into the column.

Since the fibers in actuality are of extremely small diameter, and since the same are overlapped in close proximity, it will be clear that the TV screen of this invention can be made extremely flat; that is, there is a minimum depth dimension. As already stated, the schematic illustration of FIG. 1 is greatly exaggerated with respect to the size of the fibers and reduced number of fibers for making clear the operation of the invention.

From all of the foregoing, it will now be evident that the present invention has provided a greatly improved television screen wherein an optical reproduction is provided which avoids problems of radiation characteristic of prior art cathode ray tube type screens. In addition, the advantages of a flat screen are realized.

Various changes falling within the scope and spirit of this invention will occur to those skilled in the art. The invention accordingly is not to be thought of as limited to the one embodiment set forth for illustrative purposes.

We claim:

1. A method of converting a TV video signal into light images including the steps of:
   (a) providing overlapping rows and columns of mediums, each emitting light laterally from its path when energized, such that a crossover point will emit more light than radiates from the side of a single medium when both of the crossing mediums are energized;
   (b) sequentially energizing each row;
   (c) successively energizing all of said columns during the time period that each row is energized with signals derived from said TV video signal to thereby provide an optical reproduction of the TV signal from a dot matrix of light defined at the cross-over points of the rows and columns.

2. The method of claim 1, in which said mediums constitute optical fibers treated to emit light laterally when energized with light at one end.

3. The method of claim 1, including the step of overlying said overlapping rows and columns with a filter covering having the property of emitting light at a given point on its surface only when such point is stimulated by light exceeding a given threshhold in brightness, whereby said dot matrix of light when utilizing said filter covering is reproduced with higher contrast than in the absence of the covering.

4. A flat TV screen for optically displaying images defined by a TV signal, including:
   (a) overlapping rows and columns of mediums, each emitting light laterally from its path when energized such that a cross-over point will emit more light than radiates from the side of a single medium when both of the crossing mediums are energized:
   (b) means for sequentially passing light of a constant brightness into each of said rows;
   (c) means responsive to said TV signal to modulate light in brightness in accord with the video portion of said TV signal; and
   (d) means for successively passing the modulated light into all of said columns during the time period that each row is energized to thereby provide an optical reproduction of the TV signal from a dot matrix of light defined at the crossover points of the rows and columns.

5. The subject matter of claim 4, in which said mediums constitute optical fibers treated to emit light laterally when energized with light at one end.

6. The subject matter of claim 4, including a filter covering overlying said rows and columns, said covering including means responsive only to light of brightness exceeding a given threshhold incident upon a point of the covering to emit light from said point, said emitted light being proportional in brightness to the brightness of the incident light in excess of said threshhold whereby said dot matrix of light when utilizing the filter covering is reproduced with higher contrast than in the absence of the covering.

7. The subject matter of claim 5, in which said means for sequentially passing light of a constant brightness into each of said rows includes a first laser; a first galvanometer for oscillating a mirror positioned to intercept a beam of light from said first laser so as to sweep the reflected beam back and forth sinusoidally in an horizontal direction; a second galvanometer for oscillating a mirror positioned to intercept said reflected beam in a manner to sweep the re-reflected reflected beam up and down sinusoidally in a vertical direction, whereby the re-reflected beam can be made to sweep in a circle by adjusting the amplitude and phase of oscillation of said first and second galvanometers; a first plurality of light transmitting means equal in number to the number of rows and having first ends in a circular array in positions to be successively swept by said re-reflected beam, and second ends connected respectively to said rows whereby a "scanning" of the rows is effected by light from said first laser.

8. The subject matter of claim 7, including a second laser, said means responsive to said TV signal for modulating light in brightness comprising a light modulator positioned to intercept the light from said second laser, said video signal being connected to said light modulator a first laser beam deflecting means positioned to intercept light from said light modulator and sweep the reflected beam back and forth sinusoidally in a horizontal direction; a second light beam deflecting means positioned to intercept said reflected beam and sweep the re-reflected reflected beam up and down sinusoidally in a vertical direction whereby said re-reflected beam can be made to sweep in a circle by adjusting the amplitude and phase of said first and second light beam deflecting means; a second plurality of light transmitting means equal in number to the number of said columns, and having first ends in a circular array in positions to be successively swept by said re-reflected beam and second ends connected respectively to said columns whereby a "scanning" of the columns is effected by light from said second laser, a complete scanning being effected within the time interval that any one row is energized from said first laser.

9. The subject matter of claim 8, in which said first and second light beam deflecting means comprise crystals having polished surfaces functioning as mirrors, the plane of each of said surfaces being disturbed in response to electrical energy applied to the crystal; drive means for each crystal; and synchronizing lines for passing a synchronizing signal from said TV signal to said drive means and to said first and second galvanometers.

10. The subject matter of claim 8, in which the first ends of said first plurality of light transmitting means and the first ends of said second plurality of light transmitting means are arcuate in shape following the circular sweeping of the respective re-reflected beam so that a sustained energization of each fiber in the rows and columns is effected as the re-reflected beam traverses each arcuate end.

* * * * *